(12) United States Patent
Dharmadhikari et al.

(10) Patent No.: US 11,483,798 B2
(45) Date of Patent: Oct. 25, 2022

(54) SYSTEMS AND METHODS FOR MULTI-NETWORK NOTIFICATION

(71) Applicant: CABLE TELEVISION LABORATORIES, INC., Louisville, CO (US)

(72) Inventors: Omkar Dharmadhikari, Broomfield, CO (US); Bernard McKibben, Golden, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 64 days.

(21) Appl. No.: 17/154,595

(22) Filed: Jan. 21, 2021

(65) Prior Publication Data

US 2021/0227499 A1 Jul. 22, 2021

Related U.S. Application Data

(60) Provisional application No. 62/963,764, filed on Jan. 21, 2020.

(51) Int. Cl.
*H04W 74/08* (2009.01)
*H04W 72/14* (2009.01)
*H04W 68/10* (2009.01)
*H04W 76/15* (2018.01)
*H04W 68/00* (2009.01)

(52) U.S. Cl.
CPC ......... *H04W 68/10* (2013.01); *H04W 68/005* (2013.01); *H04W 76/15* (2018.02)

(58) Field of Classification Search
CPC ... H04W 68/10; H04W 76/15; H04W 68/005; H04W 84/045; H04W 36/04
See application file for complete search history.

*Primary Examiner* — Gary Lafontant
(74) *Attorney, Agent, or Firm* — Armstrong Teasdale LLP

(57) ABSTRACT

A notification server is provided for a multi-network wireless communication system. The notification server includes a processor and a memory having computer executable instructions stored therein. The instructions, when executed by the processor, cause the processor to receive first device information from a mobile communication device wirelessly connected to a macro cell network of the multi-network wireless communication system. The instructions further cause the processor to determine, based on the received first device information, that a small cell network of the multi-network wireless communication system is available for communication with the mobile communication device. The instructions further cause the processor to transmit a notification to the mobile communication device to search for the small cell network for transition thereto.

20 Claims, 2 Drawing Sheets

SYSTEMS AND METHODS FOR MULTI-NETWORK NOTIFICATION

CROSS REFERENCE TO RELATED APPLICATIONS

This application claims the benefit of and priority to U.S. Provisional Patent Application Ser. No. 62/963,764, filed Jan. 21, 2020, which is incorporated herein by reference in its entirety.

BACKGROUND

The field of the disclosure relates generally to wireless cellular communication, and more particularly, to coordination of mobile communication devices among different types of communication networks within operable range of the devices.

Conventional wireless cellular communication systems utilize both small cells and macro cells of a macro network. Small cells are considered "small" in relation to a mobile macro cell, in that the small cell typically has a shorter range, and manages fewer concurrent wireless calls or sessions, than the macro cell. Both small cells and macro cells are conventionally utilized to implement wireless backhaul to transfer user data between a mobile wireless device and a base station of a core network through wireless connections between the device and the nodes of the network. Small cells and macro cells include hardware to receive the wireless backhaul connections, with small cells being generally lower-power (i.e.,) with respect to macro cells) cellular radio access nodes having a range from a few meters to a few kilometers.

Because small cells utilize higher frequency bands than macro cells, and because small cells are smaller and closer to the data source than macro cells, the backhaul is able transfer data to small cells more efficiently and at faster speeds than to the macro cell. Small cell operators thus conventionally offer high performance wireless services to users in targeted smaller areas. For these reasons, small cell operators have often partnered with macro networks for wider area coverage.

However, coordination between small cells and macro cells remains problematic. In order to move mobile devices across conventional small cell and macro cell networks, complex interfaces have been required. In a number of instances, macro network partners do not, or may refuse to, expose or operate the necessary interfaces to the small cell operator. In some cases, separate credentials, or even a separate Universal Mobile Telecommunications Service (UMTS) Subscriber Identify Module (USIM), may be required for each small cell seeking network access to the macro network. In other cases, the macro network operator may configure the macro network USIM and mobility controller to capture a mobile device onto the macro network, even when the small cell network is within range of the device and has sufficient signal strength, and without notifying the mobile device of the small cell alternative.

Accordingly, there is a need in this field for systems and/or methods for enabling a small cell operator to notify a mobile device within opertable range of the small cell, but operating on the macro network, to look for the small cell network and have the option of transitioning thereto. Additionally, there is also a need for small cell operators to prevent mobile devices on the small cell network from being captured on the macro network, and also to avoid the need for the costly and complex conventional interfaces between the small cell and macro cell networks.

SUMMARY

In an embodiment, a notification server for a multi-network wireless communication system includes a processor and a memory having computer executable instructions stored therein. The instructions, when executed by the processor, cause the processor to receive first device information from a mobile communication device wirelessly connected to a macro cell network of the multi-network wireless communication system. The instructions further cause the processor to determine, based on the received first device information, that a small cell network of the multi-network wireless communication system is available for communication with the mobile communication device. The instructions further cause the processor to transmit a notification to the mobile communication device to search for the small cell network for transition thereto.

In an embodiment, a wireless communication system includes a macro cell network, at least one mobile device configured for wireless communication with the macro cell network, a first small cell network configured to register the at least one mobile device for wireless communication with the first small cell network, and a notification server configured to (i) receive trigger event information from the at least one mobile device, and (ii) transmit to the at least one mobile device, in response to the received trigger event information, a notification to transition to the small cell network and release the macro cell network.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
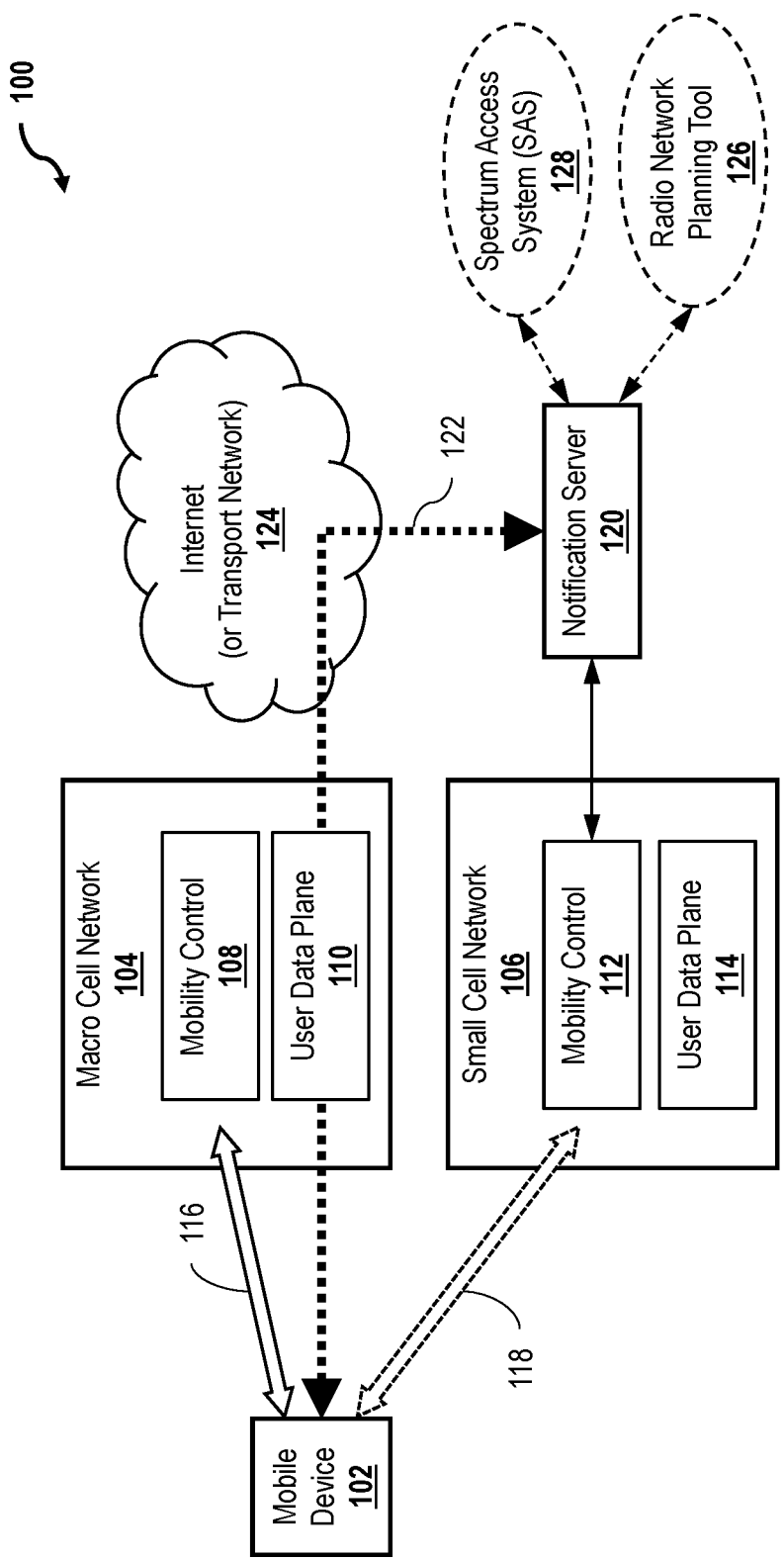
FIG. 1 is a schematic illustration of a multi-network wireless communication system, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, unless specified to the contrary, "modem termination system," or "MTS'" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As described herein, "user equipment," or UE, refers to an electronic device or system utilizing a wireless technology protocol, such as LTE or WiMAX (e.g., IEEE 802.16 protocols). Furthermore, "Wi-Fi device" refers to an electronic device, such as a station (or STA), that has the capability to access and implement one or more existing IEEE 802.11 protocols. A UE or Wi-Fi device may be fixed, mobile, or portable, and may include a transceiver or transmitter-and-receiver combination. A UE or Wi-Fi device may be separate devices, or may be represented as a single device that includes media access control (MAC) and physical layer (PHY) interface, both of which may be 802.11-conformant and/or 802.16-conformant to a wireless medium (WM).

As used herein, the term "transceiver," unless specified otherwise, refers to a two-way electronic communication device or component having a transmitting portion and a receiving portion. In some instances, the transceiver may include a specific device under test (DUT), a coherent optics transceiver, an MTS, a modem, a UE, and/or a Wi-Fi device or access point (AP).

In an exemplary embodiment, an innovative multi-network notification scheme is provided for coordinating transitions of mobile devices across multiple networks, but without need of the complex inter-network interfaces required by conventional techniques. In one aspect, the new notification systems and methods enhance mobile user experience by providing automatic capability of a small cell network to notify a mobile device to transition from a connected macro network of sufficient coverage to a sufficient and available small cell network. The present embodiments therefore improve over conventional technologies, which allow macro networks to capture mobile devices without notifying the mobile device of an available higher-performance small cell.

FIG. 1 is a schematic illustration of a multi-network wireless communication system 100. In an exemplary embodiment, system 100 is implemented for at least one mobile device 102 within operational range of at least one macro cell network 104 and also with at least one small cell network 106. In the example depicted in FIG. 1, only one mobile device 102, macro cell network 104, and small cell network 106 are illustrated for ease of explanation, and not in a limiting sense. The person of ordinary skill in the art will understand that greater numbers of these elements may be deployed without departing from the scope herein.

Further to this example, macro cell network 104 includes a macro mobility control 108 and a macro user data plane (UDP) 110, Similarly, small cell network 106 also includes at least a small cell mobility control 112 and a small cell UDP 114. The person of ordinary skill in the art will further understand that both macro cell network 104 and small cell network 106 may include additional hardware elements and functionality beyond the particular elements depicted in FIG. 1, such as conventional cellular communication hardware, processors, and software modules.

In the exemplary embodiment depicted in FIG. 1, mobile device 102 may, for example, include a UE or an LTE-enabled UE. Moreover, one or both of macro mobility control 108 and small cell mobility control 112 may include a Mobility Management Entity (MME) (e.g., such as for LTE mobility session management) or an Access and Mobility management Function (AMF) (e.g., such as for control plane function in a 5G core network). Additionally, one or both of macro UDP 110 and small cell UDP 114 may include a User Plane Function (UPF) (e.g., such as for 3GPP/5G core infrastructure) or a Serving Gateway (SGW)/Packet data network Gateway (PGW).

In exemplary operation, mobile device 120 is connected to the macro cell of macro cell network 104 over a wireless macro connection 116, and the mobility of mobile device 120 between networks may be controlled by either or both of mobile device 120 and/or macro cell network 104. A conventional macro cell may simply maintain macro connection 116 once mobile device 102 is captured by macro cell network 104, that is, as long as the signal strength from the macro cell is sufficient to maintain the connection, irrespective of the presence of small cell network 106 in operable range of mobile device 120 that able to provide higher performance wireless services to the target area in which mobile device 102 now resides.

Accordingly, in further exemplary operation, system 100 is further configured to enable small cell network 106 to page, notify, and/or push mobile device 102 to transition from macro connection 116 back to a wireless small cell connection 118 with small cell network 106, and without interference from macro cell network 104. More particularly, in the exemplary embodiment depicted in FIG. 1, small cell network 106 further includes a notification server configured to notify mobile device 102 to look for and transition to small cell network 106.

In an exemplary embodiment, such notifications to mobile device 102 from notification server 120 may include one or more of a message, a page, an alert, and a push transmitted over a notification transport path 122. Notification transport path 122 thus enables the notification to be sent transparently through macro cell network 104, and to alert mobile device 102 of the transition opportunity to small cell network 106. In some embodiments, the Internet or a transport network 124 operably connects notification server 120 to macro cell network 104 over notification transport path 122, and transparent communications over notification transport path 122 pass through macro UDP 110 of macro cell network 104. In this example, macro UDP 110 is configured to carry the notification in the same manner as any other user data traffic, and is thus transparent to macro cell network 104.

In at least one embodiment, two-way communication is enabled over notification transport path 122 between mobile device 102 and notification server 120, such that notification server 120 is able to obtain information from mobile device 102 to trigger the notification. Such device information may include without limitation, one or more of device location, macro cell information, service preferences (e.g., voice, data, or particular applications used by mobile device 102), and radio frequency (RF) conditions. In an exemplary embodiment, mobile device 102 is presumed to be subscribed to one or both of small cell network 106 and notification server 120, such that notification 120 may be easily configured to receive and/or look for messages and device information from mobile device 102 over transparent notification transport path 122 when mobile device 102 is operably connected to macro cell network 104 by wireless macro connection 116.

In further exemplary operation, mobile device 102 receives the notification over transparent notification transport path 122, and may then know to search for the small cell air interface (not separately numbered in FIG. 1) of small cell network 106. If mobile device 102. finds the small cell air interface, mobile device 102 connects with small cell network 106 over small cell macro connection 118 and releases wireless macro connection 116. If however, mobile device 102 is unable to find the small cell air interface, mobile device 102 may be further configured to report to notification server 120 (i.e., over notification transport path 122) an "out of area" message.

In some embodiments, notification server 120 is a separate, remote hardware component from small cell network 106, or may represent a dedicated software module integrated within a remote server containing relevant memory, processing, and communication elements (not separately numbered in FIG. 1) necessary to coordinate notification messages with small cell mobility control 112 of small cell network 106. In other embodiments, notification server 120 may be an integral component of small cell mobility control 112. Similarly, mobile device 102 may also contain relevant memory, processing, and communication elements (also not numbered in FIG. 1) necessary to establish and release macro connection 116 with macro cell network 104, establish and release small cell macro connection 118 with small cell network 106, and exchange information and messages with notification server 120 over notification transport path 122.

In at least one embodiment, notification server 120 may be further configured to optionally consult one or both of a radio network planning and coverage estimation tool 126 and a spectrum access system (SAS) 128, which serve to provide more accurate transition decisions and additional predictions for comparable network coverage as part of a notification decision process (described further below with respect to FIG. 2). In some embodiments, either or both of network planning tools 126 and SAS 128 may be integral components of notification server 120. In other embodiments, at least one of network planning tool 126 and SAS 128 remotely located from and operably interfaced with notification server 120.

Figure 2:
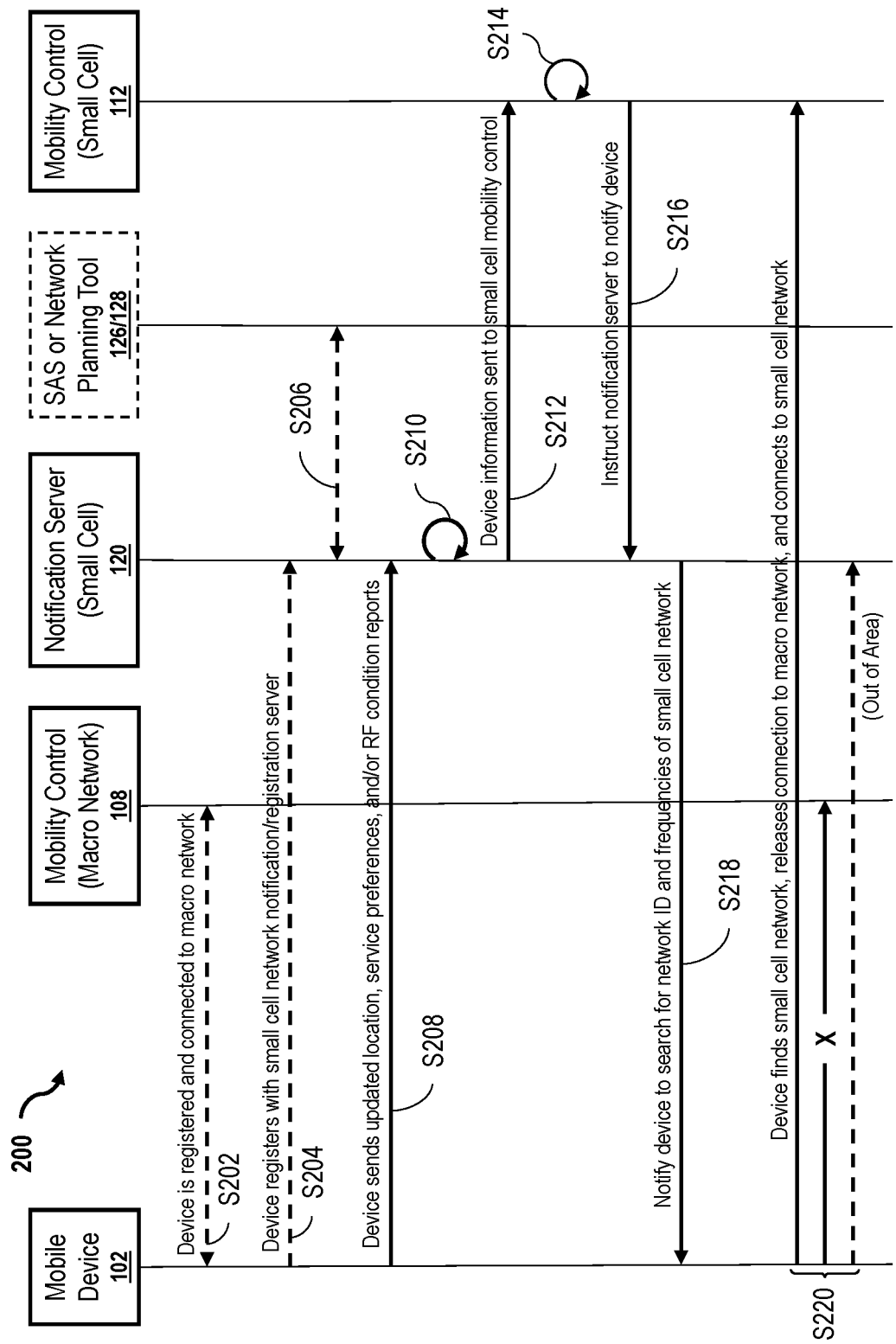
FIG. 2 is a sequence diagram depicting a notification process for the multi-network wireless communication system depicted in FIG. 1.

FIG. 2 is a sequence diagram depicting a notification process 200 for multi-network wireless communication system 100, FIG. 1. In the embodiment depicted in FIG. 2, process 200 represents an exemplary message flow technique that is executed with respect to one or more elements of system 100, including without limitation mobile device 102, macro mobility control 108, notification server 120, small cell mobility control 112, and optionally either or both of network planning tool 126 and SAS 128. Unless otherwise described herein to the contrary, an exemplary sequence of notification process 200 may execute one or more of the following steps in any particular order, sequentially or in parallel, and/or substantially simultaneously.

In an exemplary embodiment, process 200 may include one or more preliminary steps. In the embodiment depicted in FIG. 200, for example, it is presumed that mobile device 102 is registered with and connected to macro cell network 104 in preliminary step S202. Additionally, in preliminary step S204, mobile device 102 may be additionally registered with one or both of small cell network 106 and notification server 120. In an exemplary embodiment of preliminary step S204, mobile device 102 registers with notification server 120 by way of a registration message is sent along notification transport path 122 through macro UDP 110 and Internet/transport network 124. In an embodiment, the registration message may include one or more of an initial location of mobile device 120, device service preferences, and an initial RF condition report.

In some embodiments, preliminary step S204 may occur prior to preliminary step S202. In at least one embodiment, preliminary step S204 is performed by mobile device 102 prior to execution of process 200. Process 200 may further include an optional preliminary step S206, such as in the case where network planning tool 126 and/or SAS 128 are utilized, in which notification server 120 may elect to consult network planning tool 126 or SAS 128 for coverage predictions prior to an instigation or triggering event to begin non-preliminary steps of process 200.

Non-preliminary steps of process 200 begin at step S208, in which mobile device 102 sends one or more of an updated location, service preferences or updated service preferences, and an updated or current RF condition report to notification server 120. In step S210, information received by notification server 120 from mobile device 102 (e.g., an updated location being within an operational range of small cell network 106) serves to trigger notification server 120 to calculate and/or determine that mobile device 102 should be notified of the opportunity to transition to small cell network 106.

In step S212, notification server 120 transmits the information received from mobile device 102 to small cell mobility control 112. In step S214, small cell mobility control 112 confirms the transmitted information, as well as the determination to notify mobile device 102. In step S216, small cell mobility control 112 instructs notification server 120 to notify mobile device 102. In step S218, notification server 120 notifies mobile device 102 to search for the air interface of small cell network 106. In an exemplary embodiment of step S218, notification server 120 notifies mobile device 102 to search for at least one of a network ID and one or more operational frequencies of small cell network 106.

In step S220, mobile device 102 finds small cell network 106, releases macro connection 116 to macro cell network 104, and connects to small cell network 106 through small cell connection 118. In an alternative embodiment of step S220, in the case where mobile device 102 is unable to find small cell network 106, mobile device 102 maintains macro connection 116, and may additionally send an "out Of area" message to notification server 120.

According to the innovative systems and methods described herein, a small cell network is advantageously enabled to send notifications to mobile devices subscribed thereto, such that the mobile device may easily transition from a macro network to which the mobile device is operably connected. The notification server of the present embodiments further advantageously enables the notification determination based on information transparently received from the mobile device through the user data plane of the macro network, including one or more of the device location, the macro cell location, the small cell coverage area and/or location (e.g., in the case of pre-registration with the small cell), RF conditions, and service preferences such as voice, data, or device applications.

Through the transparent communication between the notification server and the mobile device over the user data plane of the macro network, no separate or specific interface is required between the macro network and the small cell network to notify the mobile device of the transition opportunity. This advantageous configuration thus renders a particular macro network universally interchangeable for a plurality of small cells utilizing the present notification server. In this manner, macro networks may be more easily user-selected and instantly exchanged, thereby creating and/or expanding new business models and opportunities for small cell operators that are not available under conventional multi-network mobile communication schemes.

In the exemplary embodiments described above, multiple small cell networks may be deployed within the operational range of a particular macro network, and a plurality of mobile devices may be subscribed to each small cell network. In at least one embodiment, a number of separate mobile devices may be subscribed to more than one small cell within the same macro network coverage. In such instances, the notification server may be further configured to select an optimum small cell from among several potential small cell candidates available to the relevant mobile device.

According to the present systems and methods, coordinated multi-network notification techniques realize significantly improved network utilization over conventional networks. The present techniques more efficiently utilize available resources to serve mobile users/clients, who in turn will realize a greatly enhanced user experience through advantageous access to the higher-performance services of small cell operators, when available to the user's mobile device.

Exemplary embodiments of systems and methods for coordinated mobility of mobile communication devices across multiple networks are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A notification server for a multi-network wireless communication system, the notification server comprising:
   a processor;
   a memory having computer executable instructions stored therein, which, when executed by the processor, cause the processor to:
      receive first device information from a mobile communication device wirelessly connected to a macro cell network of the multi-network wireless communication system;
      determine, based on the received first device information, that a small cell network of the multi-network wireless communication system is available for communication with the mobile communication device; and
      transmit a notification to the mobile communication device to search for the small cell network for transition thereto.

2. The notification server of claim 1, wherein the small cell network includes a small cell mobility control.

3. The notification server of claim 2, wherein the small cell mobility control is disposed remotely from the notification server and in operable communication therewith.

4. The notification server of claim 2, wherein the small cell mobility control comprises the notification server as an integral component thereof.

5. The notification server of claim 1, further comprising one or more of (i) a radio network planning and coverage estimation tool, and (ii) a spectrum access system (SAS).

6. The notification server of claim 1, wherein the first device information includes one or more of a present location of the mobile communication device, a location of a macro cell of the macro cell network, service preferences of the mobile communication device, and radio frequency conditions.

7. The notification server of claim 6, wherein the service preferences indicate a voice or data application of the mobile communication device.

8. The notification server of claim 1, wherein the first device information is received from the mobile communication device over a two-way communication path through a user data plane of the macro communication network.

9. The notification server of claim 8, wherein the notification is transmitted to the mobile communication device over the two-way communication path.

10. The notification server of claim 9, wherein the notification is transmitted through the user data plane of the macro communication network in a same manner as user data traffic through the user data plane.

11. The notification server of claim 9, wherein the two-way communication path includes one or a transport network or the Internet disposed between the macro cell network and the notification server.

12. The notification server of claim 9, wherein the notification includes one or more of a network ID and an operational frequency of the small cell network.

13. The notification server of claim 9, wherein the instructions further cause the processor to obtain, in response to the transmitted notification, an out of network report from the mobile communication device indicating that the mobile communication device is unable to find the small cell network.

14. The notification server of claim 1. wherein the instructions further cause the processor to register the mobile communication device with the small cell network.

15. The notification server of claim 14, wherein the instructions further cause the processor to register the mobile communication device with the small cell network prior to receiving the first device information from the mobile communication device.

16. A wireless communication system, comprising:
   a macro cell network;
   at least one mobile device configured for wireless communication with the macro cell network;
   a first small cell network configured to register the at least one mobile device for wireless communication with the first small cell network; and
   a notification server configured to (i) receive trigger event information from the at least one mobile device, and (ii) transmit to the at least one mobile device, in response to the received trigger event information, a notification to transition to the small cell network and release the macro cell network.

17. The system of claim 16, wherein the macro cell network comprises a user data plane configured to transparently carry the trigger event information and the notification between the notification server and the at least one mobile device.

18. The system of claim 17, further comprising a transport network configured to carry the trigger event information and the notification between the notification server and the user data plane of the macro cell network.

19. The system of claim 16, wherein the small cell network comprises a small cell mobility control in operable communication with the notification server.

20. The system of claim 19, wherein the notification server is disposed. (i) remotely from the small cell mobility control, or (ii) as an integral component within the small cell mobility control.

* * * * *